Feb. 5, 1924.
A. H. PLEASANTS
LOCATING DEVICE
Filed Nov. 22, 1919
1,482,440
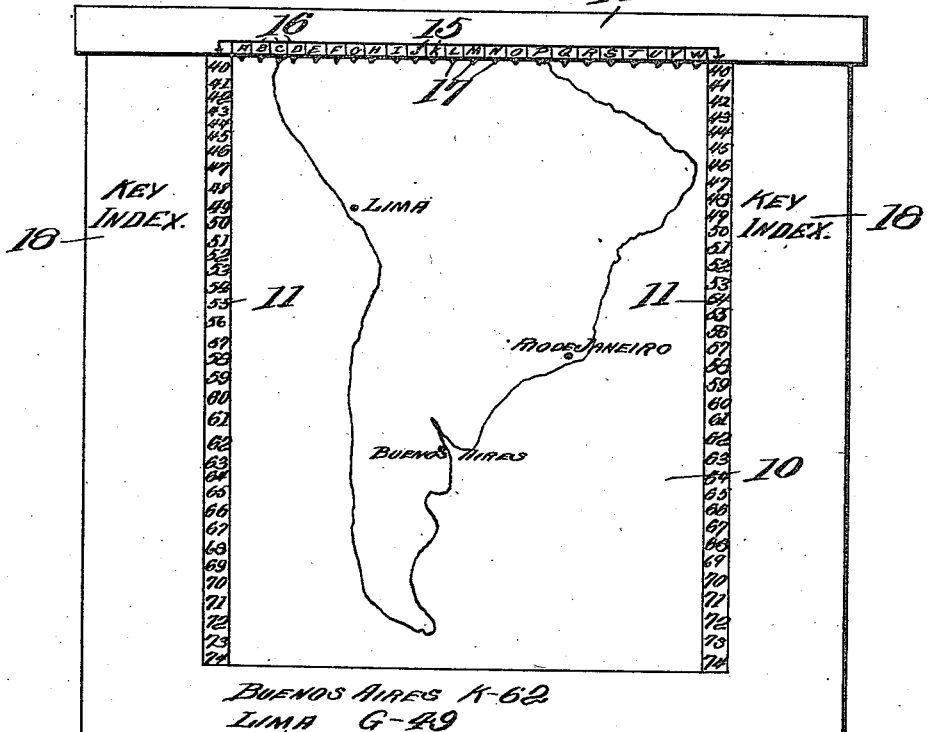
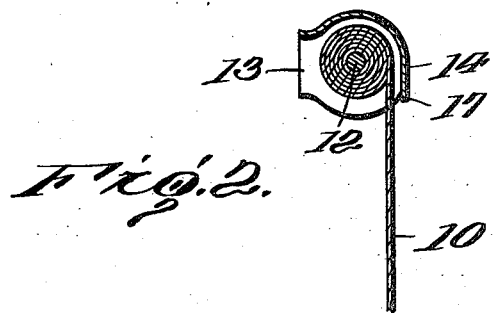

Patented Feb. 5, 1924.

1,482,440

UNITED STATES PATENT OFFICE.

ARTHUR H. PLEASANTS, OF BALTIMORE, MARYLAND.

LOCATING DEVICE.

Application filed November 22, 1919. Serial No. 340,078.

*To all whom it may concern:*

Be it known that I, ARTHUR H. PLEASANTS, a citizen of the United States, residing at Baltimore, in the county of Baltimore City and State of Maryland, have invented a new and useful Locating Device, of which the following is a specification.

This invention is a locating attachment for maps charts, diagrams, and the like. Heretofore it has been a common practice to provide one or both of the side margins of a map with indicia, such as spaced apart numbers and the top and bottom margins with indicia such as spaced apart letters or vice versa. For the purpose of assisting in locating various points on the map, a key is provided which contains a list of the names of all of said points, each name being associated with a letter and a number taken from the respective marginal indicia. This arrangement indicates that the place of the particular name correlated with the letter and number, is located approximately at the intersection of imaginary lines running inwardly from the margins in register with the designated number and letter, and at right angles to each other. Such an arangement is very useful but it is open to the objection, that the position is only approximately indicated and the eye can not always readily pick out and locate the place sought.

The object of the invention is to overcome the objection above mentioned by providing simple means whereby a portion of the marginal indicia and the face of the map may be relatively movable, whereby the eye is assisted in quickly locating the place to be sought.

The invention will be hereinafter fully set forth and particularly pointed out in the claims.

In the accompanying drawing:—

Figure 1 represents the face view of a map provided with the invention. Figure 2 is a transverse sectional view.

Referring to the drawing, 10 designates a map which may embody any territorial area desired, a map of South America having been selected for the purpose of illustration, the same being shown merely in outline. It is to be understood, however, that the invention is not limited to any particular style or kind of map, being equally applicable to maps of large or small areas, irrespective of the character of the picture employed to portray the area. Arranged vertically along the side margins of the map are two rows of spaced apart numbers indicated at 11, each row being a duplicate of the other row and shown as numbered consecutively from the top to the bottom of the map. Although numbers have been selected for this marginal indicia, it will be understood that letters may be employed instead, and that they may be arranged consecutively from the top to the bottom or from the bottom to the top as may be preferred. The characters of the respective rows may be spaced apart to any desired degree, but it is preferred to place them as close together as possible, to insure a maximum range of utility for the invention.

The sheet upon which the map 10 is printed, is attached at one end to a spring actuated roller 12, of the type commonly employed on window shades, said roller being supported by the end walls 13 of a housing which is provided with a depending front face 14. Along the lower edge of the front face 14 where it extends over the map 10, are placed indicia 15 which, in the form illustrated, consists of a series of letters of the alphabet, arranged consecutively from one side to the other, the full width of the map. It is to be understood that if the marginal indicia 11 consists of letters the indicia 15 will then consist of consecutively arranged numerals. The characters forming the basis of the indicia 15 are arranged in spaces or boxes 16, so as to limit the area that the eye must cover, thereby tending to localize the position sought. It is preferred though not necessary to provide the lower edge of the front face 14 with projections 17 which will further assist the eye in localizing the point sought.

In connection with the indicia 11 and 15, a printed key 18 is employed. Said key consists of a list of places appearing upon the map, each place having associated therewith a character taken from the indicia 17 (a letter in the instance shown) and a character taken from the indicia 15 (a number in the instance shown) to indicate the location on the map of the particular place with which the number and letter are associated. For instance, Buenos Aires is indicated as K—62, Lima as G—49; Rio de Janeiro as Q—57. The key 18 may be located at any desired position, the map 10 in the instance shown, being surrounded by a margin on which the key is printed, as indicated. Assuming that it is desired to locate Lima for instance, the lower edge of the sheet containing the map is grasped in a manner to cause the sheet to roll up on the roller 12 until the lower edge of the front face 14 registers with the number 49 of the indicia 11. The location sought will then be directly under the projection 17 of the box 16 containing the letter G, and the eye is automatically directed to the location just as soon as it registers the index letter.

From what has been said it will be readily understood that by means of the invention, the two co-ordinates by which the various points may be located are brought into juxtaposition, and that one of said co-ordinates establishes a definite tangible line instead of an imaginary one, as is the old method, thereby automatically directing the eye to the point sought to be located.

Having thus explained the nature of the invention and described an operative manner of constructing and using the same, although without attempting to set forth all of the forms in which it may be made, or all of the forms of its use, what is claimed is:—

1. Locating means for maps and the like comprising a sheet of flexible material provided with a map and locating indicia, means adjustably supporting the sheet at one end, and a fixed member overhanging the supported end of the sheet and provided with locating indicia correlated with the indicia on said sheet.

2. Locating means for maps and the like comprising a sheet of flexible material provided with a map and locating indicia, means adjustably supporting said sheet at one end, and a fixed member attached to said supporting means and overhanging the supported end of the sheet, said member having locating indicia correlated with the indicia on said sheet.

3. Locating means for maps and the like comprising a sheet of flexible material provided with a map and locating indicia, a roller upon which the sheet may be wound, and supporting means for said roller having a fixed member over-hanging the roller and positioned to have the sheet moved past it while being wound or unwound on said roller, said member having locating indicia correlated with the indicia on said sheet.

4. Locating means for maps and the like comprising a housing provided with locating indicia, a roller mounted in said housing, and a flexible sheet mounted on said roller and provided with a map and also with locating indicia correlated with the indicia of the housing.

5. Locating means for maps and the like comprising a housing having a front face provided with locating indicia along its lower edge, a roller mounted in said housing, and a flexible sheet mounted on said roller and provided with a map and also with locating indicia correlated with the indicia of the housing.

6. Locating means for maps and the like comprising a housing having a front face provided with locating indicia along its lower edge, localizing means cooperating with said indicia, a roller mounted in said housing, and a flexible sheet mounted on said roller and provided with a map and also with locating indicia correlated with the indicia of the housing.

7. Locating means for maps and the like comprising a housing having end walls and a front face, locating indicia arranged along the lower edge of said front face, a spring roller mounted in the end walls of said housing, and a flexible sheet mounted on said roller and provided with a map and also with locating indicia correlated with the indicia on said housing.

In testimony whereof I have hereunto set my hand.

ARTHUR H. PLEASANTS.